No. 874,988. PATENTED DEC. 31, 1907.
S. D. POOLE & J. KIEL.
WHEELED CULTIVATOR.
APPLICATION FILED JUNE 28, 1907.
3 SHEETS—SHEET 1.
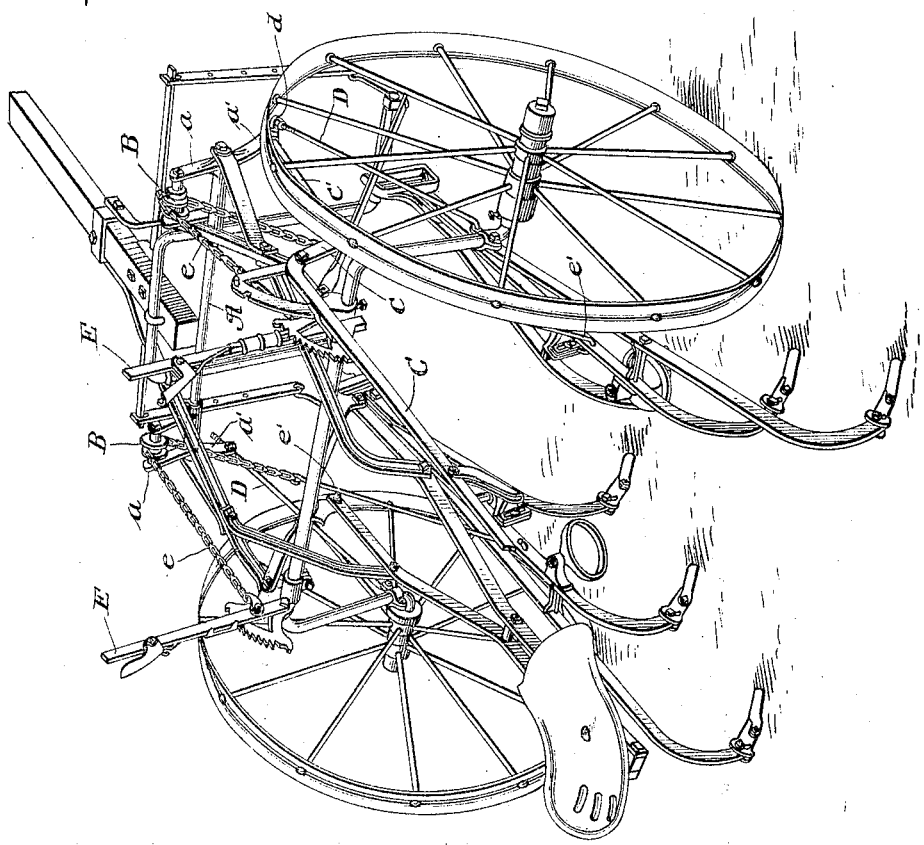

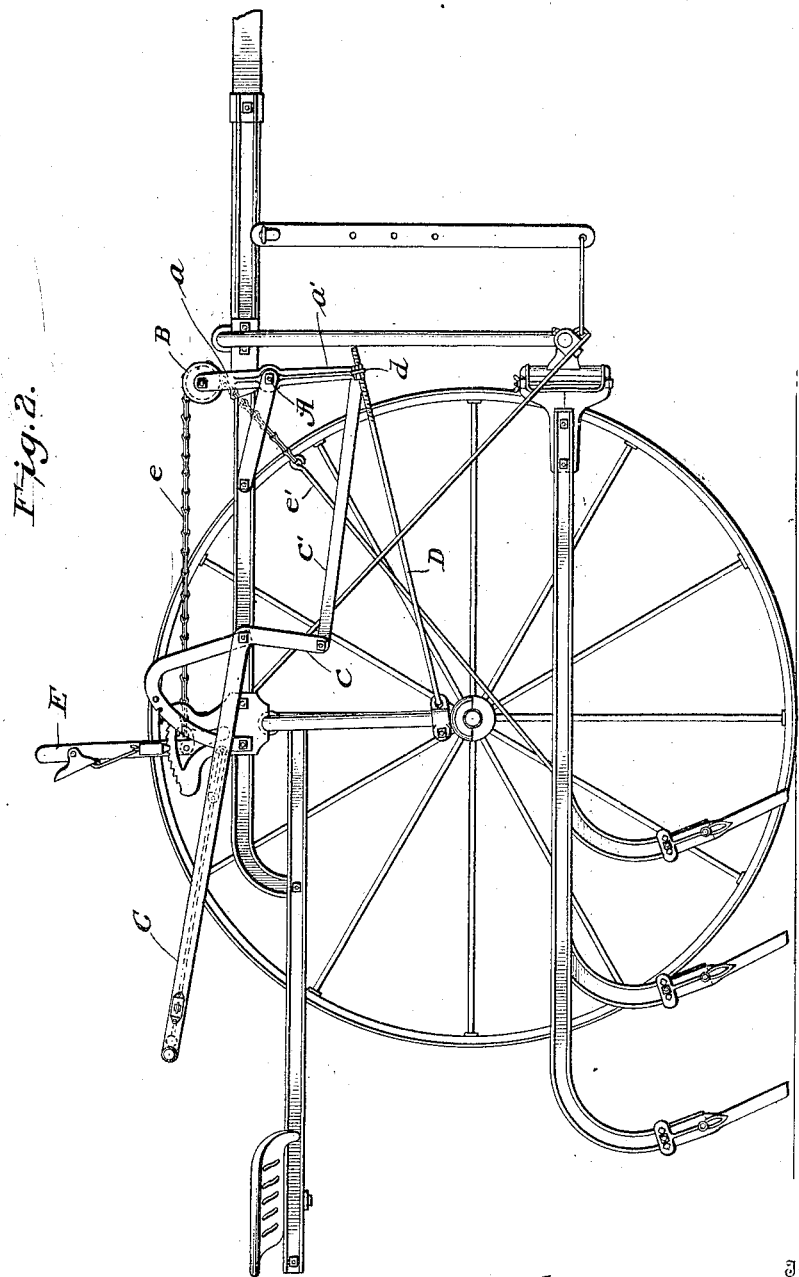

No. 874,988. PATENTED DEC. 31, 1907.
S. D. POOLE & J. KIEL.
WHEELED CULTIVATOR.
APPLICATION FILED JUNE 28, 1907.
3 SHEETS—SHEET 3.
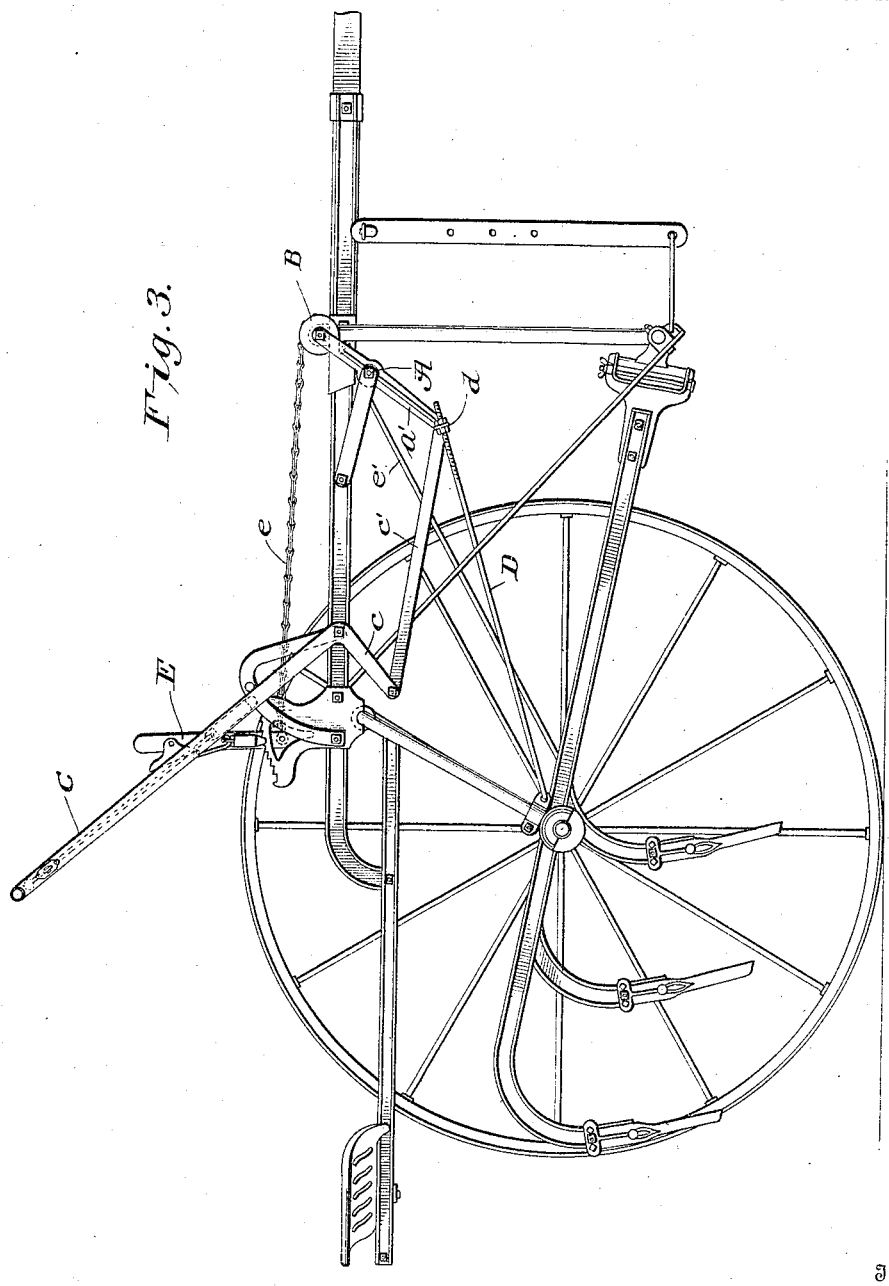

UNITED STATES PATENT OFFICE.

STALEY D. POOLE AND JOHN KIEL, OF MOLINE, ILLINOIS, ASSIGNORS TO DEERE & COMPANY, OF MOLINE, ILLINOIS, A CORPORATION OF ILLINOIS.

WHEELED CULTIVATOR.

No. 874,988.     Specification of Letters Patent.     Patented Dec. 31, 1907.

Application filed June 28, 1907. Serial No. 381,266.

*To all whom it may concern:*

Be it known that we, STALEY D. POOLE and JOHN KIEL, citizens of the United States, residing at Moline, in the county of Rock Island and State of Illinois, have invented certain new and useful Improvements in Wheeled Cultivators; and we do hereby declare the following to be a full, clear, and exact description of the invention, such as will enable others skilled in the art to which it appertains to make and use the same.

This invention relates to plows or cultivators, and more particularly to that class of machines in which a riding or sulky frame is employed with a gang or gangs of plows or cultivating implements at each side thereof, constituting what is known in the art as a wheeled straddle-row cultivator.

The main objects of our invention are to provide simple and efficient mechanism for elevating a gang or gangs of plows or cultivators and at the same time balancing the machine, together with means for regulating the depth of penetration and leveling the gangs, such means being preferably included as a part of said elevating and balancing mechanism but adapted to operate independently thereof in such manner that two or more gangs may be sustained at the same level, or the depth of penetration of either or both gangs changed as desired, and to utilize the draft of the team in elevating the gangs while preserving the balance of the machine; also to provide means for adjusting the lifting and balancing mechanism so as to preserve the balance when the machine is used by operators of different weights.

The invention will first be hereinafter more particularly described, with reference to the accompanying drawings, which are to be taken as a part of this specification, and then pointed out in the claims at the end of the description.

In said drawings, in which the same reference letters are used to denote corresponding parts in different views, Figure 1 represents a perspective view of a wheeled cultivator embodying our invention, showing the parts in the positions they occupy when the gangs are lowered to working position, Fig. 2 is a side elevation with the parts in the positions shown in Fig. 1, and Fig. 3 is a side elevation with the parts in the positions they occupy when the cultivator gangs are raised.

Referring to the drawings, the invention is shown as applied to a supporting frame having an arched axle whose vertical portions are pivotally secured thereto, to adapt the axle-spindles to swing backwardly with the wheels, and having a rearwardly extending seat-bar and suitable draft connections of ordinary construction; also having two gangs of cultivators, one at each side thereof, the beams of which are hinged or pivoted in the usual manner to the pendent portions of a draft-bar to adapt the gangs to be raised and lowered, as desired, for the purpose of regulating the depth of penetration or raising said gangs above working position.

The letter A in the drawings denotes a rock-shaft which may be fitted in suitable bearings secured to or upon the supporting frame and which is formed or provided at or near each end with an upright arm or arms $a$, and a depending arm $a'$, the upright carrying a sheave or anti-friction device B.

The letter C may denote a bell-crank lever the shorter arm $c$, of which is connected by suitable means, as a rod or bar $c'$, with one arm $a'$ of rock-shaft, the latter being also connected by a bar or rod D with a vertical portion of the axle adjacent to the axle-spindle, so that said vertical portion and the pendent arm of the rock-shaft may swing backwardly in unison when the hand-lever C is released, for the purpose of elevating the gangs, as hereinafter described.

To regulate the depth of penetration we may employ hand-levers E, E, mounted upon the machine frame and provided with the usual pawl and ratchet devices for locking the levers in different positions, each lever being connected with a cultivator gang at one side of the machine by suitable flexible connections extending around the sheave or anti-friction device carried by an upright arm of the rock shaft; the connections shown consisting of a chain $e$, engaging a hook on the lever and extending thence around the sheave and engaging a hook or eye on the end of a connecting rod $e'$, the other end of which is secured to a cultivator gang. By these means either gang may be raised or lowered sufficiently to level or change the depth of penetration, without interfering with the gang-elevating and machine-balancing mechanism which consists in part of said depth-regulating devices. It will also be observed that when the upright arm of the rock-shaft is thrown forward, the regulating lever being locked, the flexible connection with the cultivator gang will travel over the sheave or anti-friction device, thus raising the cultivator gang; this movement being accomplished, when the bell-crank lever is released, by the draft of the team, causing the wheels to move backwardly, as it were, while the supporting frame moves forward. This movement, as will be observed, (assuming that the supporting frame is a lever of the first order having its fulcrum upon the axle-spindles) will change the fulcrum and thereby compensate for the additional weight of the gangs of plows or cultivators when raised above working position.

In order to preserve the balance of the machine when operated by men of different weights, the length of the rods D may be increased or diminished, the effect of which is to shift the fulcrum to adapt the machine to the weight of the operator. This adjustment may be accomplished by means of adjustable nuts on a threaded portion of the rod, where it passes through the eye of the swivel d connecting it with the pendent arm of the rock-shaft, one nut being placed at each side of the swivel.

In operation, when the gangs of plows or cultivators are in working position, as shown in Figs. 1 and 2, the bell-crank lever being locked, will hold the rock-shaft with the arms thereof in substantially a vertical position, as shown in Fig. 2, and by means of the rods connecting the pendent arms of said rock-shaft with the axle-spindles or vertical portions of the axle the latter will be maintained in substantially a vertical position, but when said bell-crank lever is released by the usual pawl and ratchet the draft of the team will cause the wheels to move backwardly carrying the pendent arms of the rock-shaft and throwing the upright arms thereon with the anti-friction devices carried thereby forward, and as the regulating levers remain locked, the cultivator gangs will be raised, the bell-crank lever being thrown into the position shown in Fig. 3. The mechanism may be restored to normal position indicated in Figs. 1 and 2 by lowering the bell-crank lever to the position shown in the latter figure.

It will be understood that the rock-shaft with its rigid upright and depending arms may be constructed integrally or in separable parts secured together by suitable fastening means, the word "rigid", as applied to the arms of said shaft, including either arms integral with the shaft, or secured thereto so as to revolve with the shaft. The word "gang" or "gangs", as employed herein, is also intended to refer to any suitable plow or cultivating device, or devices, which may be used in coöperation with the gang-elevating and machine balancing mechanism, and the term "arched axle" is intended to refer to any suitable construction adapted for the purposes of the invention, whether an arched axle in the true sense of the word or not; for instance, upright rods or bars having spindles for the wheels thereon and secured to the supporting frame in such manner that they may swing backwardly with the wheels, so as to change the fulcrum, may be used instead of the arched form shown. While we also preferably employ a bell-crank lever and connections substantially as shown and described, it is obvious that other constructions may be effectually employed, and various changes may be made in the details without departing from the spirit of our invention.

Having thus described our invention what we claim as new and desired to secure by Letters Patent is:

1. A gang plow or cultivator comprising a wheeled supporting frame to which the gangs are hinged, and gang elevating and machine-balancing mechanism mounted thereon, adapted to be actuated by the draft of the team and including as a part thereof depth-regulating and gang-leveling devices adapted to operate independently of said elevating and balancing mechanism for changing the depth of penetration and leveling the gangs.

2. In combination with a supporting frame having its axle-spindles arranged to swing backwardly with the wheels, a multiple-armed rock-shaft on said frame having upright and pendent arms the latter being connected with vertical portions of said axle, a lever connected with one of said arms for rocking said shaft, and a flexible connection extending from a fixed point on the machine frame over the free end of an upright arm on said rock-shaft to a cultivator gang, whereby the latter may be raised by the draft of the team and the wheels simultaneously thrown back to balance the machine.

3. In combination with a wheeled supporting frame having the vertical portions of an axle arranged to swing backwardly with the wheels, a multiple-armed rock-shaft on said frame having an upright arm carrying an anti-friction device and depending arms connected with the vertical portions of said axle, a hand-lever connected with one of said depending arms for rocking said shaft, and a second lever having a flexible connection extending therefrom over said anti-friction device and secured to a cultivator gang, whereby the depth of penetration may be regulated, the draft of the team utilized in raising the gang and the wheels thrown back to balance the machine when the gangs are raised.

4. In combination with a supporting frame and axle-spindles secured thereto so that the wheels may swing backwardly, a rock-shaft on said frame having a pair of arms extending in opposite directions therefrom, one of said arms carrying an anti-friction device, a hand-lever and connections between the same and one of said arms for rocking said shaft, and a depth-regulating device including a lever having a flexible connection extending therefrom around said anti-friction device and secured to a gang, whereby said regulating device and the draft of the team are utilized in raising the gang and preserving the balance of the machine.

5. In combination with a supporting frame and axle-spindles arranged to swing backwardly with the wheels, a rock-shaft on said frame having arms extending in opposite directions therefrom, a hand-lever and a rod or bar connecting the same with one of said arms for rocking said shaft, and a depth-regulating lever having a flexible connection extending therefrom around a sheave carried by another arm of said rock-shaft and secured to a cultivator gang, substantially as and for the purpose described.

6. In combination with a supporting frame having a movable arm thereon carrying a sheave, a hand-lever, a flexible connection extending from said hand-lever around said sheave to a cultivator gang, for regulating the depth of penetration, and mechanism including said flexible connection operated by the draft of the team for moving said arm and raising said gang and at the same time preserving the balance of the machine.

7. In combination with the supporting frame having a movable arm thereon carrying a sheave, said arm being rigid with a rock-shaft, an arm depending from said shaft and connected with the short arm of a bell-crank lever pivoted upon the machine frame and provided with a suitable locking device, a second lever and locking device on said frame having a flexible connection extending therefrom around the sheave carried by the first mentioned arm to a cultivator gang, and suitable draft connections, whereby when the first mentioned lever is unlocked the wheels will be thrown backwardly by the draft of the team simultaneously shifting the position of said movable arm and raising the cultivator gang.

8. A straddle-row cultivator comprising a wheeled frame and suitable draft connections, said frame being pivotally mounted upon an arched axle, a rock-shaft on said frame having at each end an upstanding and a depending arm rigid therewith, said upstanding arm carrying a sheave or pulley, rods connecting the free ends of said depending arms with the arched axle, a bell crank lever and suitable locking devices therefor mounted on said frame, said lever having its short arm connected with one of the depending arms of said rock-shaft, and a second lever and suitable locking devices therefor mounted on said frame and having a flexible connection extending therefrom over the sheave or pulley on the upright arm of said rock-shaft to a cultivator gang.

9. A straddle-row cultivator comprising a suitable frame having an arched axle pivotally secured thereto and a rearwardly extending seat-bar, a rock-shaft in front of the axle having upwardly and downwardly extending arms thereon, a lever for rocking said shaft, a rod connecting the arched axle with an arm depending from said rock-shaft, and depth-regulating devices including a lever and connections extending therefrom around a sheave on an upwardly extending arm on said rock-shaft to a cultivator gang, whereby the latter will be raised by the rocking of the shaft caused by the backward movement of the wheels.

10. In combination with the wheeled supporting frame fulcrumed upon the wheels and having gang-elevating and machine-balancing mechanism thereon, an adjusting device for said elevating and balancing mechanism adapted to change the fulcrum to balance the machine with operators of different weights.

11. In combination, a wheeled supporting frame mounted upon an arched axle to which it is pivotally secured, gang-elevating and machine-balancing mechanism on said frame comprising a hand-lever and means for locking the same in different positions, a multiple-armed rock-shaft, rods connecting pendent arms of said rock-shaft with the upright portions of said arched axle and a rod connecting one of said pendent arms with said hand-lever, and a depth-regulating lever and means for locking the same in different positions together with a flexible connection extending therefrom over a sheave carried by an upright arm on said shaft and secured to the gang to be elevated, substantially as described.

12. In combination with the wheeled supporting frame pivotally secured upon an arched axle and having its fulcrum upon the wheels, a multiple-armed rock-shaft on said frame, adjustable rods connecting pendent arms of said shaft with the upright portions of said arched axle, a bell-crank lever pivoted on said frame, a rod connecting one of the pendent arms of said shaft with the shorter arm of said lever, a second lever pivoted on said frame and flexible connections extending therefrom to a cultivator gang around a sheave carried by an upright arm on said shaft, substantially as described.

In testimony whereof we affix our signatures, in presence of two witnesses.

STALEY D. POOLE,
JOHN KIEL.

Witnesses:
CHAS. H. POPE.
FRED D. HOLT.